(12) United States Patent
Takaoka et al.

(10) Patent No.: US 11,196,377 B2
(45) Date of Patent: Dec. 7, 2021

(54) MOTOR DRIVE SYSTEM

(71) Applicant: HITACHI AUTOMOTIVE SYSTEMS, LTD., Hitachinaka (JP)

(72) Inventors: Midori Takaoka, Tokyo (JP); Junki Isobe, Hitachinaka (JP); Kohei Myoen, Hitachinaka (JP); Toshiyuki Ajima, Tokyo (JP); Kazuaki Tobari, Tokyo (JP); Yoshitaka Iwaji, Tokyo (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 16/767,675

(22) PCT Filed: Nov. 28, 2018

(86) PCT No.: PCT/JP2018/043687
§ 371 (c)(1),
(2) Date: May 28, 2020

(87) PCT Pub. No.: WO2019/111776
PCT Pub. Date: Jun. 13, 2019

(65) Prior Publication Data
US 2020/0389117 A1 Dec. 10, 2020

(30) Foreign Application Priority Data
Dec. 4, 2017 (JP) .............................. JP2017-232534

(51) Int. Cl.
*H02P 23/00* (2016.01)
*H02P 25/00* (2006.01)
(Continued)

(52) U.S. Cl.
CPC .............. *H02P 27/08* (2013.01); *B62D 5/046* (2013.01); *H02M 7/537* (2013.01); *H02P 21/06* (2013.01); *H02P 21/20* (2016.02); *H02P 21/22* (2016.02)

(58) Field of Classification Search
CPC .......... H02P 27/08; H02P 21/20; H02P 21/22; B62D 5/046; H02M 7/537
(Continued)

(56) References Cited

U.S. PATENT DOCUMENTS

2009/0189555 A1* 7/2009 Chen ....................... H02P 21/22
318/400.07
2009/0237013 A1 9/2009 Sato
(Continued)

FOREIGN PATENT DOCUMENTS

JP H11-299297 A 10/1999
JP 2004-023843 A 1/2004
(Continued)

OTHER PUBLICATIONS

International Search Report with English translation and Written Opinion issued in corresponding application No. PCT/JP2018/043687 dated Mar. 5, 2019.
(Continued)

*Primary Examiner* — Erick D Glass
(74) *Attorney, Agent, or Firm* — Foley & Lardner LLP

(57) ABSTRACT

In a motor drive device 120, a phase compensation amount calculation unit 110 calculates a phase compensation amount $\Delta\theta$ for compensating a voltage phase $\theta v^*$ when a control mode is switched in a control selection unit 90. The control selection unit 90 outputs the three-phase voltage command $Vuvw^*$ according to any one of the plurality of control modes based on the modulation factor $Kh^*$, the voltage phase $\theta v^*$, and the phase compensation amount $\Delta\theta$. A PWM
(Continued)

control unit 100 outputs gate signals Gun, Gup, Gvn, Gvp, Gwn, and Gwv based on the three-phase voltage command Vuvw* and a rotor position θd. The inverter 20 has a plurality of switching elements, and controls the plurality of switching elements based on gate signals Gun, Gup, Gvn, Gyp, Gwn, and Gwv to drive the AC motor 10.

9 Claims, 12 Drawing Sheets

(51) Int. Cl.
   *H02P 27/00* (2006.01)
   *H02P 27/08* (2006.01)
   *H02P 21/20* (2016.01)
   *H02P 21/22* (2016.01)
   *B62D 5/04* (2006.01)
   *H02M 7/537* (2006.01)
   *H02P 21/06* (2016.01)

(58) Field of Classification Search
   USPC .......................................................... 318/811
   See application file for complete search history.

(56) References Cited

U.S. PATENT DOCUMENTS

| | | | |
|---|---|---|---|
| 2011/0181231 A1* | 7/2011 | Ito ........................... | B60L 50/51 318/801 |
| 2011/0273125 A1 | 11/2011 | Yamada et al. | |
| 2011/0279071 A1* | 11/2011 | Yamada ................... | H02P 27/08 318/400.02 |
| 2015/0069941 A1* | 3/2015 | Iwaji ....................... | H02P 6/183 318/400.11 |
| 2015/0333682 A1* | 11/2015 | Amemiya ............... | H02P 21/22 318/400.02 |
| 2016/0211790 A1 | 7/2016 | Ajima | |
| 2017/0294864 A1* | 10/2017 | Tada ....................... | H02P 29/50 |
| 2019/0252972 A1* | 8/2019 | Minaki ................... | H02P 27/08 |

FOREIGN PATENT DOCUMENTS

| | | |
|---|---|---|
| JP | 2007-181398 A | 7/2007 |
| JP | 2007-306699 A | 11/2007 |
| JP | 4053968 B2 | 2/2008 |
| JP | 2014-082865 A | 5/2014 |
| JP | 2015-019458 A | 1/2015 |
| JP | 2016-059245 A | 4/2016 |

OTHER PUBLICATIONS

Extended European Search Report issued in European Patent Application No. 18886511.7 dated Jul. 8, 2021.

Office Action issued in corresponding Japanese Patent Application No. 2017-232534 dated Oct. 5, 2021 with English machine translation.

* cited by examiner (a) MODULATION FACTOR 1 (LINEAR AREA)

(b) MODULATION FACTOR 1.16 (OVERMODULATION AREA)

(a) RELATION BETWEEN MODULATION AREA AND VOLTAGE COMMAND WAVEFORM (b) RELATION BETWEEN MODULATION AREA AND MOTOR OPERATION AREA (a) SWITCHING SHOCK (MODULATION FACTOR)

(b) SWITCHING SHOCK (VOLTAGE VECTOR)

(a) VOLTAGE COMPENSATION (b) PHASE COMPENSATION (a) PULSE LOSS DUE TO SHAPE CHANGE OF MODULATION WAVE (b) VOLTAGE PHASE CHANGE DUE TO SWITCHING SHOCK (a) CASE WHERE PHASE COMPENSATION IS ABSENT (b) CASE WHERE PHASE COMPENSATION IS PRESENT

MOTOR DRIVE SYSTEM

TECHNICAL FIELD

The present invention relates to a motor drive system.

BACKGROUND ART

Conventionally, in a motor drive system that drives a motor by pulse width modulation (PWM) control using an inverter, it has been desired to increase power of the output voltage of the inverter in order to expand the operating area of the motor. In order to increase the power of the output voltage of the inverter, it is effective to utilize voltage waveform areas called an overmodulation area and a rectangular wave area. In these areas, large torque is output from a motor in the middle and high speed areas compared to a normal sine wave area. However, on the other hand, in the overmodulation area and the rectangular wave area, the inverter output voltage is saturated, so that the PWN pulse disappears. As a result, when the control area switched between the sine wave area and the overmodulation area or the rectangular wave area, the voltage vector of the motor increases discontinuously, and the modulation factor changes sharply. This phenomenon is called switching shock. Since such a switching shock causes a torque fluctuation, the motor control becomes unstable. Therefore, in order to output torque stably from the sine wave area to the rectangular wave area, a technique for suppressing a switching shock at the time of switching the control area is required. In particular, in asynchronous PWM control that performs PWM control with a constant carrier frequency, the positive-side voltage integration and the negative-side voltage integration that change in half the cycle of the AC output are unbalanced. As a result, the switching shock occurs remarkably. Therefore, it is important to appropriately suppress the switching shock.

With respect to the reduction of the switching shock, the technique of PTL 1 is known. PTL 1 discloses that a modulation wave is linearly approximated in a predetermined angle section around a zero cross point of an inverter output voltage, and in this angle section, one of a center interval of ON pulses and a center interval of OFF pulses of a plurality of PWM pulses is changed based on a motor output request. As a result, it is possible to prevent the disappearance of the PWM pulse in the vicinity of the zero cross where the slope of the voltage command is steep (around 0° and 180°), and it is possible to suppress the switching shock.

CITATION LIST

Patent Literature

PTL 1: JP 2015-19458

SUMMARY OF INVENTION

Technical Problem

Since the technique described in PTL 1 is for preventing the disappearance of the PWM pulse near the zero cross, not possible to sufficiently prevent the disappearance of the PWM pulse near the peak of the inverter output voltage (around 90 degrees and 270 degrees). Therefore, there is room for improvement in reducing the switching shock.

Solution to Problem

A motor drive system according to the invention includes an AC motor, a rotor position detection unit that detects a rotor position of the AC motor, a current sensor that detects a three-phase AC current flowing through the AC motor, a coordinate conversion unit that calculates a d-axis current and a q-axis current of the AC motor based on the rotor position and the three-phase AC current, a current control unit that outputs a d-axis voltage command and a q-axis voltage command based on an input d-axis current command value and q-axis current command value, and based on the d-axis current and the q-axis current, a modulation factor/voltage phase calculation unit that calculates a modulation factor and a voltage phase based on the d-axis voltage command and the q-axis voltage command, a phase compensation amount calculation unit that calculates a phase compensation amount for compensating the voltage phase, a control selection unit that outputs a three-phase voltage command according to anyone of a plurality of control modes based on the modulation factor, the voltage phase, and the phase compensation amount, a PWM control unit that outputs a gate signal based on the three-phase voltage command and the rotor position, and an inverter that includes a plurality of switching elements, and controls the plurality of switching elements based on the gate signal to drive the AC motor. The phase compensation amount calculation unit calculates the phase compensation amount and outputs the calculated amount to the control selection unit when the control mode is switched by the control selection unit.

Advantageous Effects of Invention

According to the invention, the switching shock can be reduced.

DESCRIPTION OF EMBODIMENTS

First Embodiment

Hereinafter, a first embodiment of the invention will be described with reference to FIGS. 1 to 9.

Figure 1:
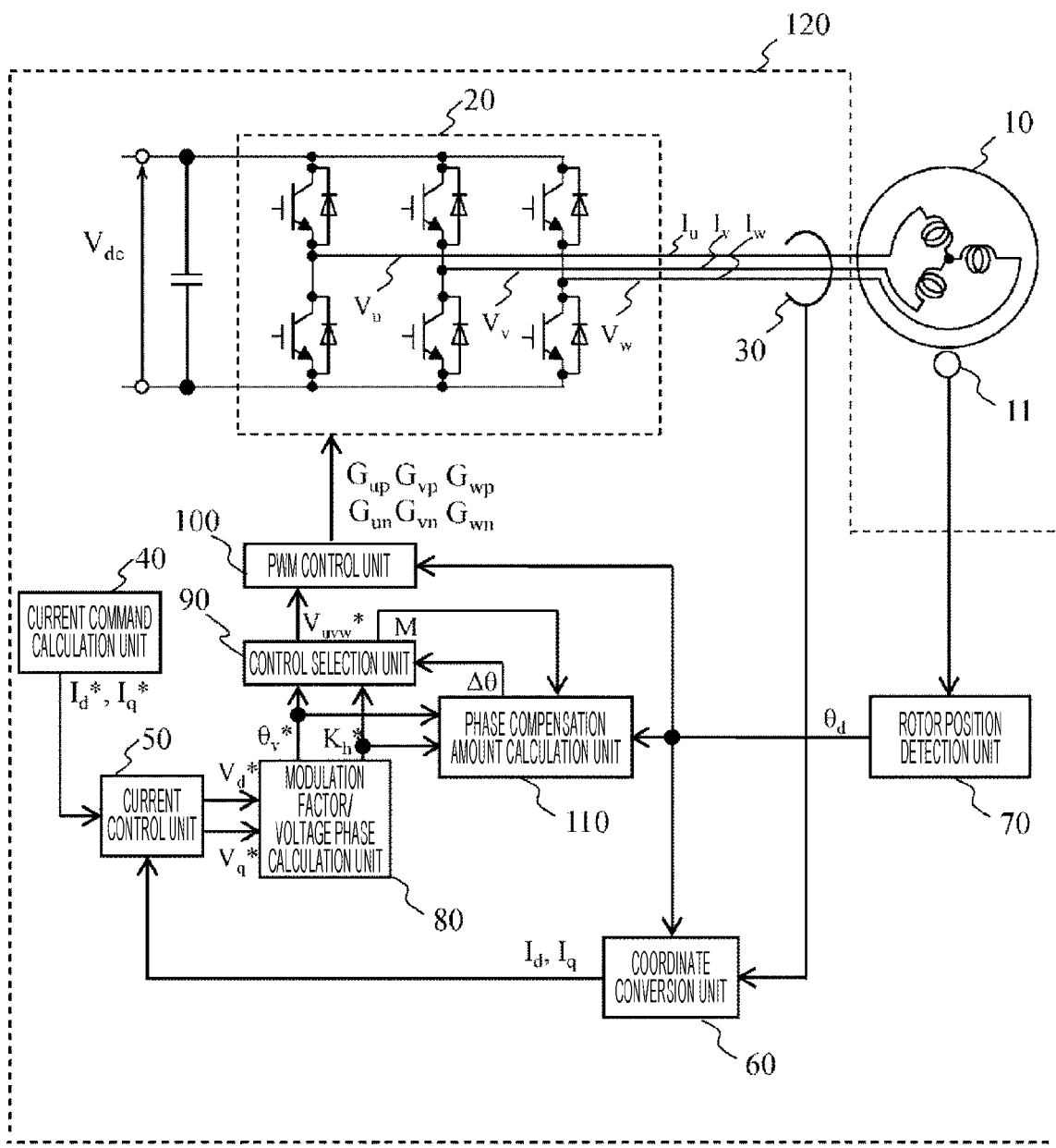
FIG. 1 is a configuration diagram of a motor drive system according to a first embodiment of the invention.

FIG. 1 is a configuration diagram of a motor drive system according to the first embodiment of the invention. The motor drive system illustrated in FIG. 1 includes an AC motor 10 and a motor drive device 120. The motor drive device 120 is a device that is connected to the AC motor 10 and performs drive control of the AC motor 10, and includes an inverter 20, a current sensor 30, a current command calculation unit 40, a current control unit 50, a coordinate conversion unit 60, a rotor position detection unit 70, a modulation factor/voltage phase calculation unit 80, a control selection unit 90, a PWM control unit 100, and a phase compensation amount calculation unit 110. Further, the current command calculation unit 40, the current control unit 50, the coordinate conversion unit 60, the rotor position detection unit 70, the modulation factor/voltage phase calculation unit 80, the control selection unit 90, the PWM control unit 100, and the phase compensation amount calculation unit 110 are realized as functions of a CPU by executing a predetermined program in the CPU included in the motor drive device 120, for example.

A rotational position sensor 11 is attached to the AC motor 10. Here, as the rotational position sensor 11, it is preferable to use a resolver including an iron core and a winding. However, another sensor that can detect the rotational position of the AC motor 10, for example, a GMR sensor using a giant magnetoresistance effect, a sensor using a Hall element, or the like may be used as the rotational position sensor 11.

The rotor position detection unit 70 detects a rotor position θd of the AC motor 10 based on a signal from the rotational position sensor 11. The rotor position θd detected by the rotor position detection unit 70 is output from the rotor position detection unit 70 to the coordinate conversion unit 60, the PWM control unit 100, and the phase compensation amount calculation unit 110.

The current sensor 30 detects three-phase AC currents Iu, Iv, and Iw flowing from the inverter 20 to the AC motor 10, and outputs the detected currents to coordinate conversion unit 60.

The coordinate conversion unit 60 calculates a d-axis current Id and a q-axis current Iq of the AC motor 10 based on the rotor position θd from the rotor position detection unit 70 and the three-phase AC currents Iu, Iv, and Iw from the current sensor 30, and outputs the calculated currents to the current control unit 50.

The current command calculation unit 40 calculates a d-axis current command value Id* and a q-axis current command value Iq*, and outputs the values to the current control unit 50. For example, when the motor drive device 120 controls a rotation speed ωr of the AC motor 10, the current command calculation unit 40 calculates the rotation speed ωr based on the time change of the rotor position θd, and a d-axis current command value Id* and a q-axis current command value Iq* are calculated so that this rotation speed ωr matches the speed command ωr* input from the high-level controller (not illustrated). Further, when the motor drive device 120 controls output torque τm of the AC motor 10, the current command calculation unit 40 calculates the d-axis current command value Id* and the q-axis current command value Iq* using a predetermined calculation formula, map, or the like so that the output torque τm matches a torque command value τ* input from the high-level controller. Other than this, it is possible to calculate the d-axis current command value Id* and the q-axis current command value by an arbitrary method. Alternatively, the d-axis current command value Id* and the q-axis current command value Iq* may be directly input from the outside without providing the current command calculation unit 40 in the motor drive device 120.

The current control unit 50, based on the d-axis current command value Id* and the q-axis current command value Iq* input from the current command calculation unit 40, and the d-axis current Id and the q-axis current Iq from the coordinate conversion unit 60, calculates and outputs a d-axis voltage command Vd* and a q-axis voltage command Vq* so that these values match each other.

The modulation factor/voltage phase calculation unit 80 calculates and outputs a modulation factor Kh* and a voltage phase θv* based on the d-axis voltage command Vd* and the q-axis voltage command Vq* input from the current control unit 50. Here, the modulation factor Kh* and the voltage phase θv* are calculated based on the following (Equation 1) and (Equation 2), respectively.

[Math. 1]

$$K_h^* = tranF \cdot \frac{\sqrt[2]{(V_d^{*2} + V_q^{*2})}}{V_{dc}} \quad \text{(Equation 1)}$$

However, in (Equation 1), tranF represents a coordinate conversion coefficient, and Vdc represents a DC voltage input to the inverter 20.

[Math. 2]

$$\theta_v^* = \tan^{-1} \frac{V_q^*}{V_d^*} \quad \text{(Equation 2)}$$

The modulation factor Kh* and the voltage phase θv* output from the modulation factor/voltage phase calculation unit 80 and the rotor position θd output from the rotor position detection unit 70 are input to the phase compensation amount calculation unit 110. When control modes N output from the control selection unit 90 changes, the phase compensation amount calculation unit 110 calculates a phase compensation amount Δθ for compensating the voltage phase θv* based on at least one of modes.

The details of the method of calculating the phase compensation amount. Δθ by the phase compensation amount calculation unit 110 will be described later.

The control selection unit 90 outputs a control mode M and a three-phase voltage command Vuvw* based on the modulation factor Kh* and voltage phase θv* from the modulation factor/voltage phase calculation unit 80 and the phase compensation amount Δθ from the phase compensation amount calculation unit 110. The three-phase voltage command Vuvw* includes a U-phase voltage command Vu*, a V-phase voltage command Vv*, and a W-phase voltage command Vu*. The details of the control selection unit 90 will be described later with reference to FIG. 2.

The PWM control unit 100 performs a pulse width modulation in which periodical conversion using a triangular wave or a sawtooth wave as a carrier wave is performed at a predetermined frequency based on the three-phase voltage command Vuvw* from the control selection unit 90 and the rotor position θd from the rotor position detection unit 70 so as to generate gate signals Gun, Gup, Gvn, Gvp, Gwn, and Gwv for each of the upper and lower arms of each phase. Then, these generated gate signals are output to the inverter 20.

The inverter 20 includes a plurality of switching elements each corresponding to the upper and lower arms of each phase. Each switching element is configured using a semiconductor element such as an IGBT or a MOSFET. The inverter 20 generates pulse voltages Vu, Vv, and Vw of the respective phases from a DC voltage Vdc by controlling ON/OFF of each switching element based on the gate signals Gun, Gup, Gvn, Gvp, Gwn, and Gwv, and outputs the voltages to AC motor 10. As a result, the DC voltage Vdc is converted into an AC voltage, and the frequency and the effective voltage value of the AC voltage are adjusted to drive the AC motor 10.

Figure 2:
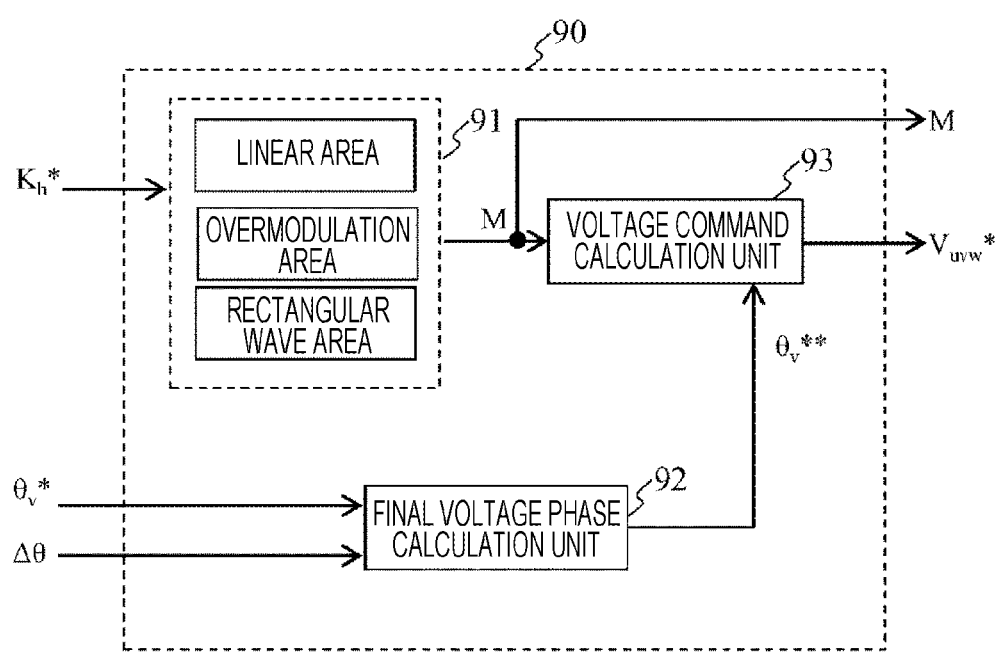
FIG. 2 is a diagram illustrating details of a control selection unit.

FIG. 2 is a diagram illustrating details of the control selection unit 90. As illustrated in FIG. 2, the control selection unit 90 includes functional blocks of a modulation area selection unit 91, a final voltage phase calculation unit 92, and a voltage command calculation unit 93.

The modulation area selection unit 91 selects any one of a linear area, an overmodulation area, and a rectangular wave area based on the modulation factor Kh* input from the modulation factor/voltage phase calculation unit 80. Further, the linear area is a modulation area where the output voltage of the inverter 20 is not saturated, and the overmodulation area is a modulation area where the output voltage of the inverter 20 is in a saturated state. The rectangular wave area is a modulation area in which the output voltage of the inverter 20 is maximum, that is, a modulation area in which the DC voltage Vdc is alternately output to each phase following the rotation of the AC motor 10. After selecting any one of the modulation areas, the modulation area selection unit 91 determines a control mode corresponding to the selected modulation area as a control mode N to be a target of the voltage command calculation, and outputs the determined control mode N to the phase compensation amount calculation unit 110.

The final voltage phase calculation unit 92 calculates a final voltage phase θv** which is a final voltage phase to be used in the voltage command calculation based on the voltage phase θv* input from the modulation factor/voltage phase calculation unit 80 and the phase compensation amount Δθ input from the phase compensation amount calculation unit 110, and outputs the calculated value to the voltage command calculation unit 93.

The voltage command calculation unit 93 calculates the three-phase voltage command Vuvw* based on the control mode determined by the modulation area selection unit 91 and the final voltage phase θv calculated by the final voltage phase calculation unit 92, and outputs the calculated command to the PWM control unit 100**.

Figure 3:
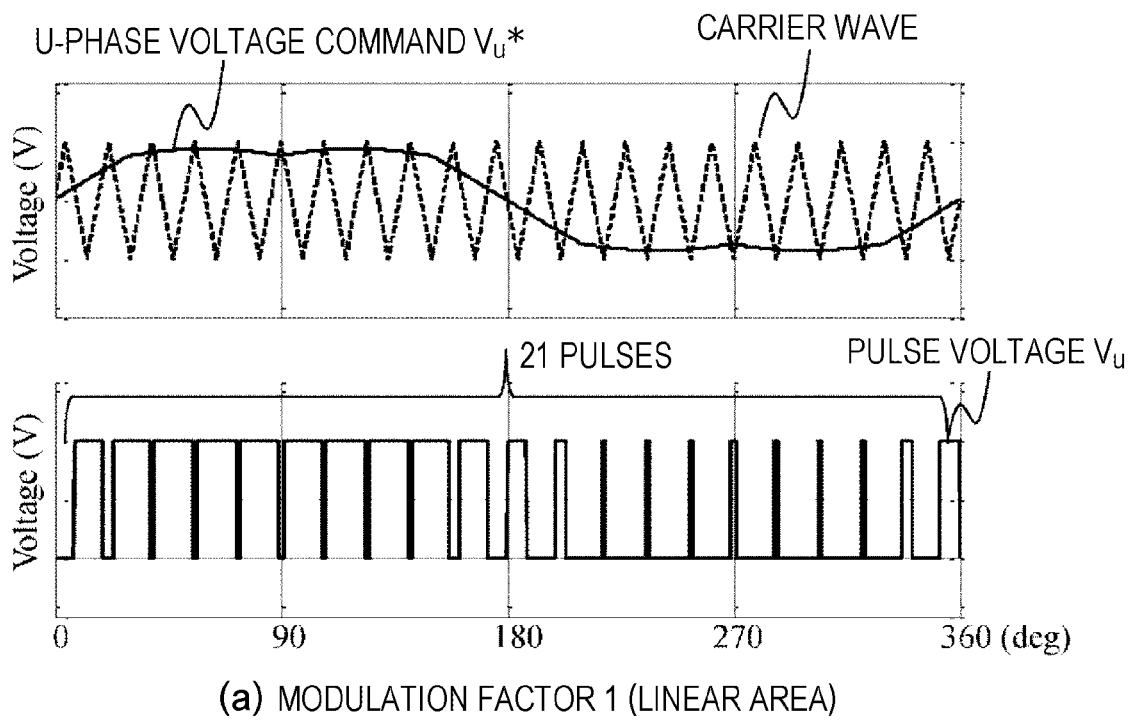
FIG. 3 is a diagram illustrating a relation between a voltage command waveform and a PWM pulse.
Figure 3:
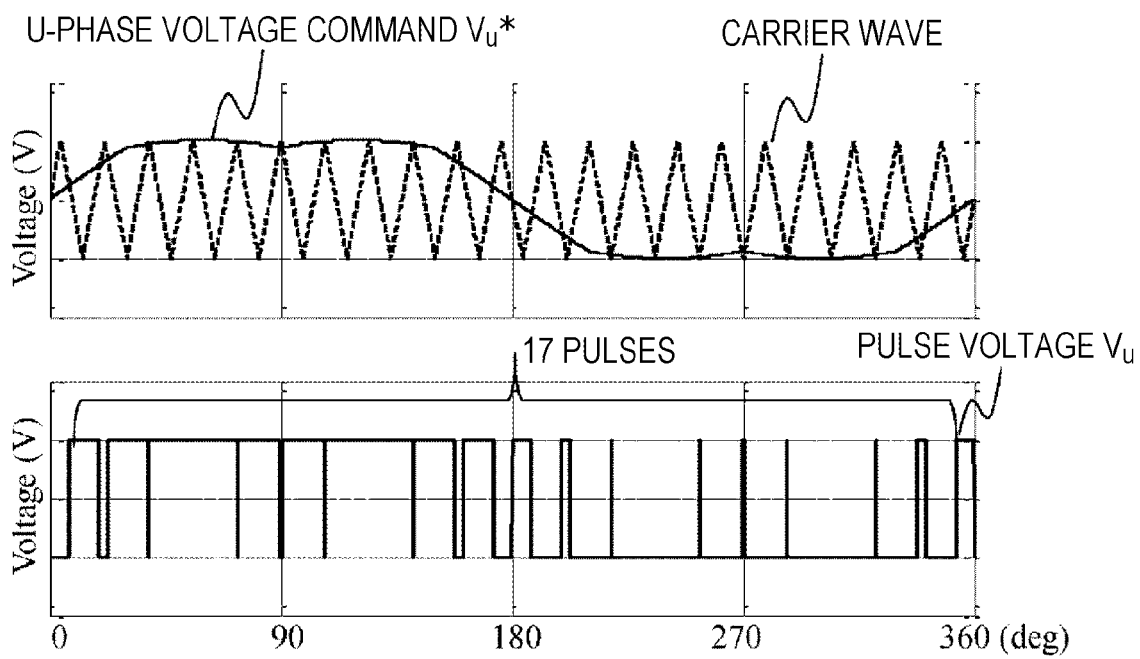
Figure 4:
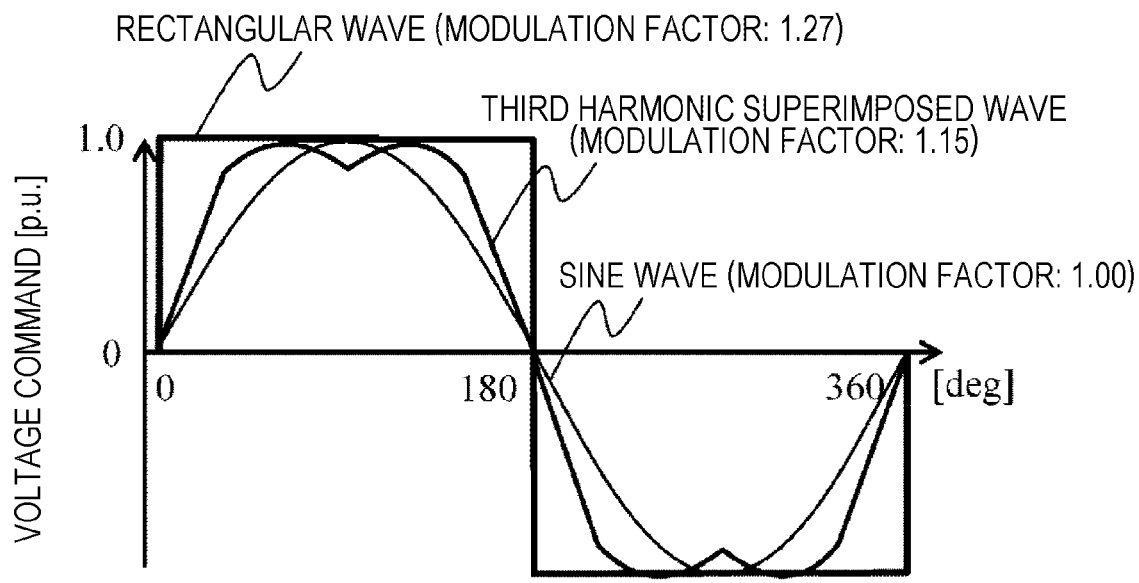
FIG. 4 is a diagram illustrating a relation between a modulation area, a voltage command waveform, and a motor operation area.
Figure 4:
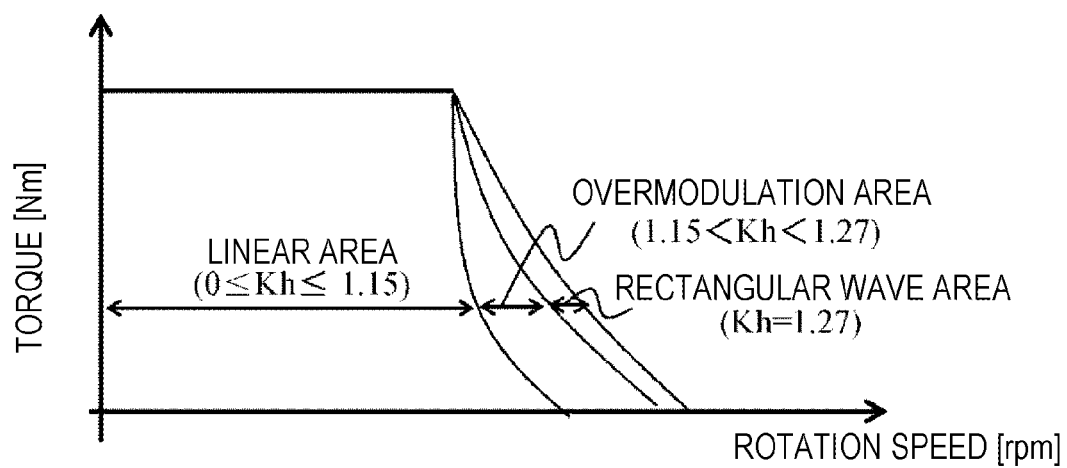

Next, a method for selecting a modulation area in the modulation area selection unit 91 in the control selection unit 90 and a method for calculating the three-phase voltage command Vuvw* in the voltage command calculation unit 93 will be described with reference to FIGS. 3 and 4. FIG. 3 is a diagram illustrating a relation between a voltage command waveform and a PWM pulse. In FIG. 3, (a) illustrates an example of the voltage command waveform and the PWM pulse in a sine wave area with a modulation factor of 1, and (b) illustrates an example of the voltage command waveform and the PWM pulse in the overmodulation area with a modulation factor of 1.16. FIG. 4 is a diagram illustrating a relation between a modulation area, a voltage command waveform, and a motor operation area. In FIG. 4, (a) illustrates the relation between the modulation area and the voltage command waveform, and (b) illustrates the relation between the modulation area and the motor operation area.

The PWM control unit 100 compares the three-phase voltage command Vuvw* with the amplitude of the carrier wave as illustrated in each of FIGS. 3(a) and 3(b), and generates a PWM pulse of each phase according to the comparison result. Then, the timing for setting the gate signals Gun, Gup, Gvn, Gvp, Gwn, and Gwv to high or low is determined based on the generated PWM pulse of each phase, and the gate signals Gun, Gup, Gvn, Gvp, Gwn, and Gwv are generated. FIGS. 3(a) and 3(b) illustrate only the U-phase voltage command Vu* of the three-phase voltage commands Vuvw* as a representative example, but the same applied to the V-phase voltage command Vv* and the W-phase voltage command Vw*. Further, in FIGS. 3(a) and 3 (b), a triangular wave is used as a carrier wave, but a sawtooth wave may be used as a carrier wave. Here, the PWM control unit 100 may perform asynchronous PWM control to keep the frequency of the carrier wave constant, or perform synchronous PWM control to change the frequency of the carrier wave according to the rotation speed ωr of the AC motor 10. In this embodiment, it is assumed that the PWM control unit 100 performs the asynchronous PWM control.

The inverter 20 performs switching driving of each switching element according to the gate signals Gun, Gup, Gvn, Gvp, Gwn, and Gwv input from the PWM control unit 100, and generates the pulse voltages Vu, Vv, and Vw of each phase as illustrated in FIGS. 3(a) and 3(b). FIGS. 3(a) and 3(b) illustrate only the U-phase pulse voltage Vu among the three-phase pulse voltages Vu, Vv, and Vw as a representative example, but the same applies to the V-phase pulse voltage Vv and the W-phase pulse voltage Vw.

In the PWM control performed by the PWM control unit 100, a relation between the modulation factor Kh* and the effective value of the inverter output voltage (hereinafter, referred to as actual modulation factor Kh) is generally known to be linear in the modulation factor Kh*≤1 region where the pulse voltages Vu, Vv, and Vw, which are the output voltages of the inverter 20, are not saturated. Here, when the modulation factor Kh* is 1, the actual modulation factor Kh is set to 1.

Here, in the PWM control, generally, not only a sine wave as a fundamental wave but also a waveform in which a third harmonic is superimposed on the fundamental wave can be used as a voltage command waveform of each phase. As illustrated in FIG. 4(a), when the sine wave is used as the voltage command waveform, the peak reaches a maximum value when the modulation factor Kh* is 1, and when the value of the modulation factor Kh* is higher, it becomes the overmodulation area. When the superimposed wave of the third harmonic is a voltage command waveform, the peak reaches a maximum value when the modulation factor Kh* is 1.15, and when the value of the modulation factor Kh* is higher, it becomes the overmodulation area. Therefore, the linear area can be expanded to the range of the modulation factor Kh*≤1.15.

Based on the above, in the motor drive device 120 of this embodiment, when the modulation factor Kh* is 1.15 or less, the control selection unit 90 selects the linear area by the modulation area selection unit 91. At this time, the voltage command calculation unit 93 generates a superimposed wave of the third harmonic as illustrated in FIG. 4(*a*), and outputs the wave to the PWM control unit 100 as a three-phase voltage command Vuvw*. When the modulation factor Kh* is 1 or less, a sine wave may be output to the PWM control unit 100 as the three-phase voltage command Vuvw*.

In the overmodulation area where the modulation factor Kh* exceeds 1.15, the output voltage of the inverter 20 is saturated. Therefore, as illustrated in FIG. 3(*b*), the number of PWM pulses per one cycle of the voltage command is reduced compared with the case of the linear area illustrated in FIG. 3(*a*). Hereinafter, such a decrease in the PWM pulse in the overmodulation area is referred to as "pulse disappearance". Due to this pulse disappearance, the relation between the modulation factor Kh* and the actual modulation factor Kh becomes non-linear in the overmodulation area.

By utilizing the overmodulation area, the actual modulation factor Kh can be increased compared with the linear area. Therefore, as illustrated in FIG. 4(*b*), the motor operation area can be expanded compared with the linear area, and AC motor 10 can be driven to a higher rotation speed. Therefore, in the motor drive device 120 of this embodiment, when the modulation factor Kh* is within a range from 1.15 to a predetermined maximum value, the control selection unit 90 selects the overmodulation area by the modulation area selection unit 91. At this time, the voltage command calculation unit 93 generates a waveform of a predetermined shape according to the value of the modulation factor Kh*, for example, a waveform or a trapezoidal wave obtained by deforming the superimposed wave of the third harmonic, and outputs the waveform to the PWM control unit 100 as a three-phase voltage command Vuvw*.

When the modulation factor Kh* is further increased and the actual modulation factor Kh is increased to the maximum value of 1.27, the waveform enters the rectangular wave area. In this rectangular wave area, as illustrated in FIG. 4(*b*), the motor operation area can be further expanded than the overmodulation area, and the AC motor 10 can be driven to a higher rotation speed. Therefore, in the motor drive device 120 of this embodiment, when the modulation factor Kh* is a predetermined maximum value corresponding to Kh=1.27, the control selection unit 90 selects the rectangular wave area by the modulation area selection unit 91. At this time, the voltage command calculation unit 93 generates a rectangular wave as illustrated in FIG. 4(*a*) and outputs the wave to the PWM control unit 100 as a three-phase voltage command Vuvw*.

As described above, in the motor drive device 120 of this embodiment, the control selection unit 90 determines the control mode M based on the modulation factor Kh*, and the three-phase voltage command Vuvw* of a waveform corresponding to the control mode M is output. That is, the modulation area selection unit 91 selects any one of the linear area, the overmodulation area, and the rectangular wave area based on the modulation factor Kh*, and determines the control mode M according to the selection result. Then, the voltage command calculation unit 93 changes the waveform of the three-phase voltage command Vuvw* according to the control mode M, and outputs the waveform to the PWM control unit 100. The PWM control unit 100 generates a PWM pulse according to the waveform of the three-phase voltage command Vuvw*, generates the gate signals Gun, Gup, Gvn, Gvp, Gwn, and Gwv, and outputs the generated signals to the inverter 20 to perform the PWM control. As a result, the output of the inverter 20 can be increased by utilizing the linear area to the rectangular wave area, and the motor operation area can be expanded.

Figure 5:
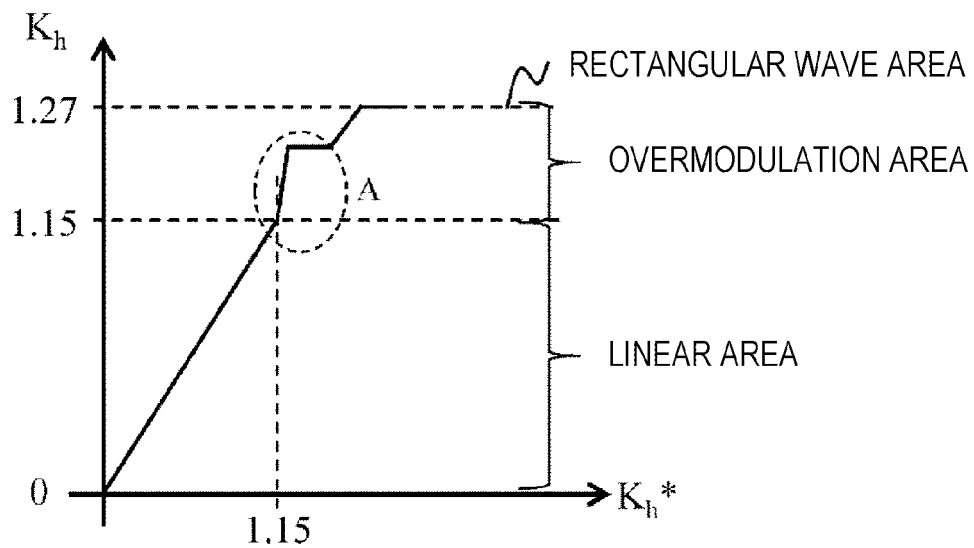
FIG. 5 is an explanatory diagram of switching shock due to pulse disappearance.
Figure 5:
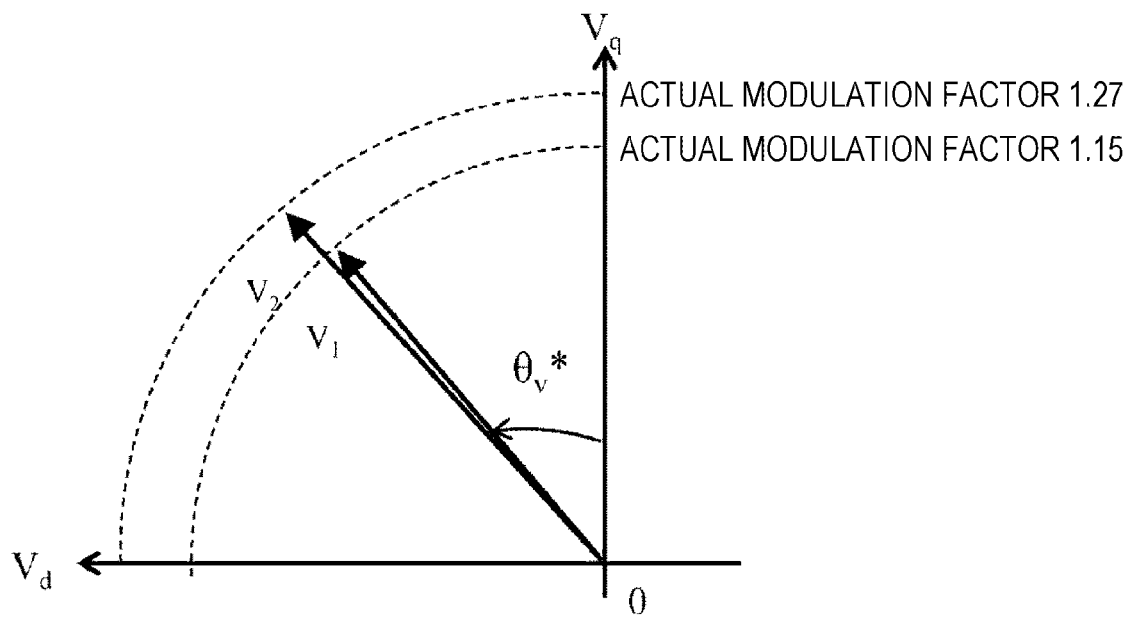

Next, a problem in utilizing the overmodulation area and the rectangular wave area will be described with reference to FIG. 5. FIG. 5 is an explanatory diagram of switching shock due to pulse disappearance.

In the overmodulation area and the rectangular wave area, since the output voltage of the inverter 20 is saturated, pulse disappearance occurs as described above, and the relation between the modulation factor Kh* and the actual modulation factor Kb becomes non-linear. Here, when the pulse disappearance occurs, the off time of the pulse voltages Vu, Vv, and Vw decreases, and the on time increases. Therefore, as illustrated in part A of FIG. 5(*a*), when the modulation factor Kh* becomes 1.15 or more, the actual modulation factor Kh may increase sharply. At this time, the magnitude of a voltage vector V of the d-axis voltage command Vd* and the q-axis voltage command Vq* increases discontinuously from V1 to V2 as illustrated in FIG. 5(*b*). As a result, the magnitude of the q-axis voltage command Vq* changes discontinuously. Such a phenomenon is called a switching shock. Further, the voltage vector V can be represented by $V = \text{tranF}\sqrt{(Vd^{*2} + Vq^{*2})}$.

When the switching shock occurs, a torque fluctuation occurs in the AC motor 10 due to a change in q-axis voltage command Vq*. In particular, in the asynchronous PWM control, the pulse disappearance is more remarkable than in the synchronous PWM control, so that the switching shock increases and the torque fluctuation of the AC motor 10 increases accordingly. Therefore, when utilizing from the linear area to the rectangular wave area, it is important to stably drive the AC motor 10 by suppressing the switching shock due to the pulse disappearance and reducing the torque fluctuation caused by the switching shock.

In the motor drive device 120 of this embodiment, the phase compensation using the phase compensation amount calculation unit 110 is performed in order to suppress the switching shock due to the pulse disappearance as described above. That is, when the control mode M changes, the phase compensation amount calculation unit 110 calculates the phase compensation amount Δθ. At this time, in the control selection unit 90, the final voltage phase calculation unit 92 calculates the final voltage phase θv based on the phase compensation amount Δθ calculated by the phase compensation amount calculation unit 110, and the voltage command calculation unit 93** calculates the three-phase voltage command Vuvw* using the final voltage phase θv**. With this configuration, a sudden change in the magnitude of the voltage vector V is prevented, and torque fluctuations are reduced.

Figure 6:
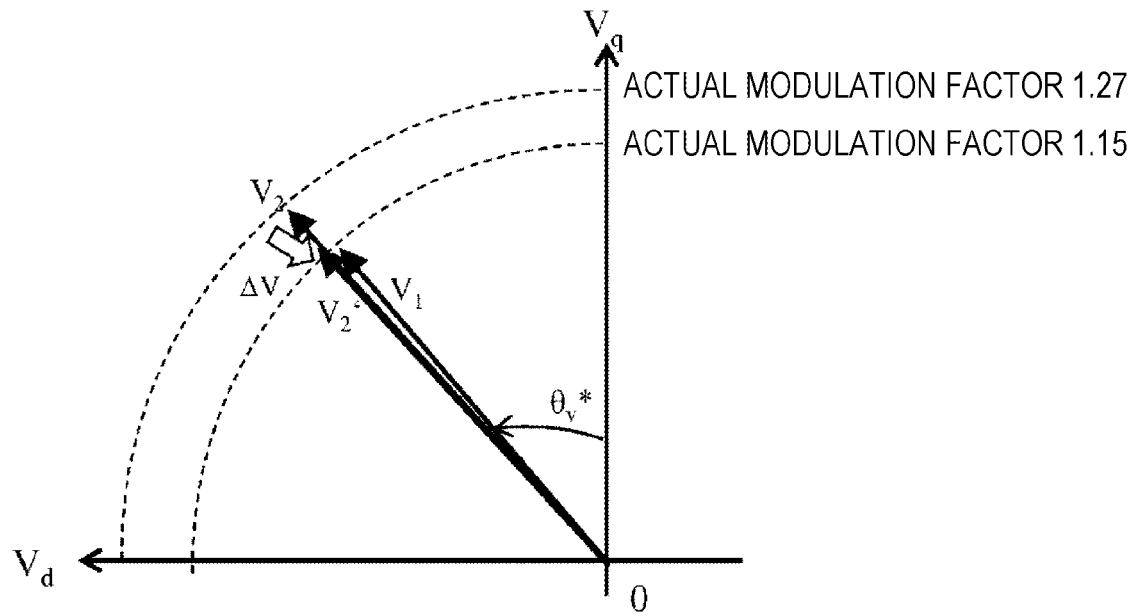
FIG. 6 is an explanatory diagram of a method for reducing switching shock due to pulse disappearance.
Figure 6:
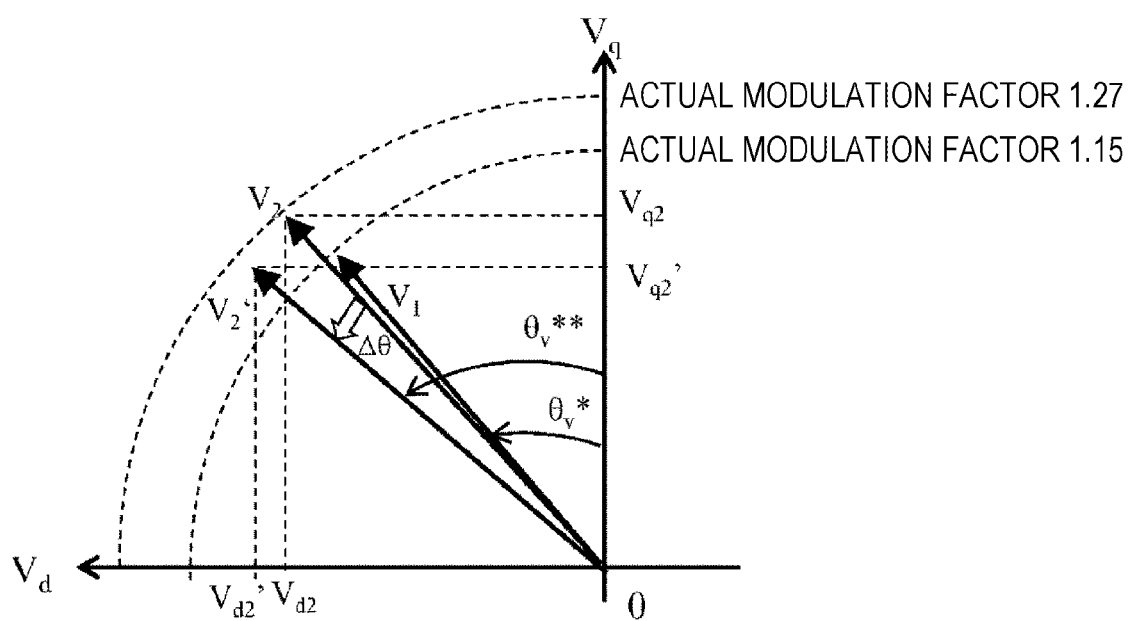

Next, phase compensation by the phase compensation amount calculation unit 110 will be described with reference to FIG. 6. FIG. 6 is an explanatory diagram of a method for reducing switching shock due to pulse disappearance.

As a method of suppressing the switching shock due to the pulse disappearance and reducing the torque fluctuation, there are a method called voltage compensation in which the magnitude of the voltage vector V is changed and a method called phase compensation in which the phase of the voltage vector V is changed. In the voltage compensation, as illustrated in FIG. 6(*a*), a voltage compensation amount ΔV is calculated, and when the pulse disappearance occurs, the magnitude of the voltage vector V is adjusted by the voltage compensation amount ΔV, so that it suppressed that the voltage vector V is discontinuously increased from V1 to V2. In the phase compensation, as illustrated in FIG. 6(b), the phase compensation amount Δθ is calculated, and when the pulse disappearance occurs, the phase of the voltage vector V is adjusted by the phase compensation amount Δθ, so that the magnitude of the voltage vector V remains unchanged, the switching shock is suppressed by changing a distribution of the d-axis voltage command Vd* and the q-axis voltage command Vq*, and the torque fluctuation reduced.

In the motor drive device 120 of this embodiment, the latter phase compensation is adopted in consideration of the calculation load of the voltage compensation amount ΔV and the like. That is, when the pulse disappearance occurs, the phase compensation amount calculation unit 110 calculates the phase compensation amount Δθ. In the control selection unit 90, the final voltage phase calculation unit 92 calculates the final voltage phase θv** using the phase compensation amount Δθ, and the voltage command calculation unit 93 calculates and outputs the three-phase voltage command Vuvw*. As a result, the torque fluctuation is reduced by suppressing the switching shock due to the pulse disappearance.

Next, a method for calculating the phase compensation amount Δθ will be described.

A d-axis voltage Vd and a q-axis voltage Vq of the AC motor 10 are each expressed as the following (Equation 3) using the d-axis current Id and the q-axis current Iq calculated by the coordinate conversion unit 60.

[Math. 3]

$$\begin{cases} V_d = RI_d - \omega_r L_q I_q \\ V_q = RI_q + \omega_r L_d I_d + \omega_r K_e \end{cases} \quad \text{(Equation 3)}$$

However, in (Equation 3), Ld and Lq represent a d-axis inductance and a q-axis inductance of the AC motor 10, respectively. In addition, R represents a resistance of the AC motor 10, and Ke represents an induced voltage constant of the AC motor 10.

Here, in the middle and high speed areas utilizing the overmodulation area and the rectangular wave area, the rotation speed ωr of the AC motor 10 becomes large, so that the second term and the followings of (Equation 3) are dominant in each of the d-axis voltage Vd and the q-axis voltage Vq. Therefore, (Equation 3) is modified, and the d-axis voltage Vd and the q-axis voltage Vq can be respectively approximated as in the following (Equation 4).

[Math. 4]

$$\begin{cases} V_d \approx -\omega_r L_q I_q \\ V_q \approx \omega_r L_d I_d + \omega_r K_e \end{cases} \quad \text{(Equation 4)}$$

On the other hand, torque τ of the AC motor 10 is expressed by the following (Equation 5) using the d-axis current Id and the q-axis current Iq.

[Math. 5]

$$\tau = \text{tranF} \cdot P_r \{K_e I_q + (L_d - L_q) I_d I_q\} \quad \text{(Equation 5)}$$

However, in (Equation 5), Pr represents the number of pole pairs of the AC motor 10.

From (Equation 5), a torque fluctuation of the AC motor 10 caused by the switching shock is expressed by the following (Equation 6) using a fluctuation amount ΔId of the d-axis current Id and the fluctuation amount ΔIq of the q-axis current Iq.

[Math. 6]

$$\Delta \tau = \text{tranF} \cdot P_r \{K_e \Delta I_q + (L_d - L_q) \Delta I_d \Delta I_q\} \quad \text{(Equation 6)}$$

Here, a fluctuation amount ΔVd of the d-axis voltage Vd and a fluctuation amount ΔVq of the q-axis voltage Vq are obtained using the fluctuation amount ΔId of the d-axis current Id and the fluctuation amount ΔIq of the q-axis current Iq based on the above (Equation 4). Thus, they can be approximated as shown in the following (Equation 7).

[Math. 7]

$$\begin{cases} \Delta V_d \approx -\omega_r L_q \Delta I_q \\ \Delta V_q \approx \omega_r L_d I_d + \omega_r K_e \end{cases} \quad \text{(Equation 7)}$$

As illustrated in (Equation 7), the fluctuation amount ΔId of the d-axis current Id is represented as a value corresponding to the fluctuation amount ΔVq of the q-axis voltage Vq. Similarly, the fluctuation amount ΔIq of the q-axis current Iq is represented as a value corresponding to the fluctuation amount ΔVd of the d-axis voltage Vd. Therefore, from the above and (Equation 6), it can be seen that the distribution of the fluctuation amount ΔVd of the d-axis voltage Vd and the fluctuation amount ΔVq of the q-axis voltage Vq, that is, the distribution of the fluctuation amount ΔId of the d-axis current Id and the fluctuation amount ΔIq of the q-axis current Iq is changed to suppress the torque fluctuation Δτ.

Therefore, in the motor drive device 120 of this embodiment, when switched to the control mode M in which the pulse disappearance occurs, the phase compensation amount calculation unit 110 calculates the phase compensation amount Δθ by the following (Equation 8). Then, in the final voltage phase calculation unit 92 of the control selection unit 90, the phase compensation amount Δθ is added to the voltage phase θv*, that is, the phase is advanced or subtracted, that is, the phase is delayed, and the final voltage phase θv** is calculated. Thus, torque fluctuation Δτ is suppressed, and the AC motor 10 can output smooth torque τ from the linear area to the rectangular wave area.

[Math. 8]

$$\Delta \theta = \tan^{-1} \frac{\Delta V_q}{\Delta V_d} \quad \text{(Equation 8)}$$

Figure 7:
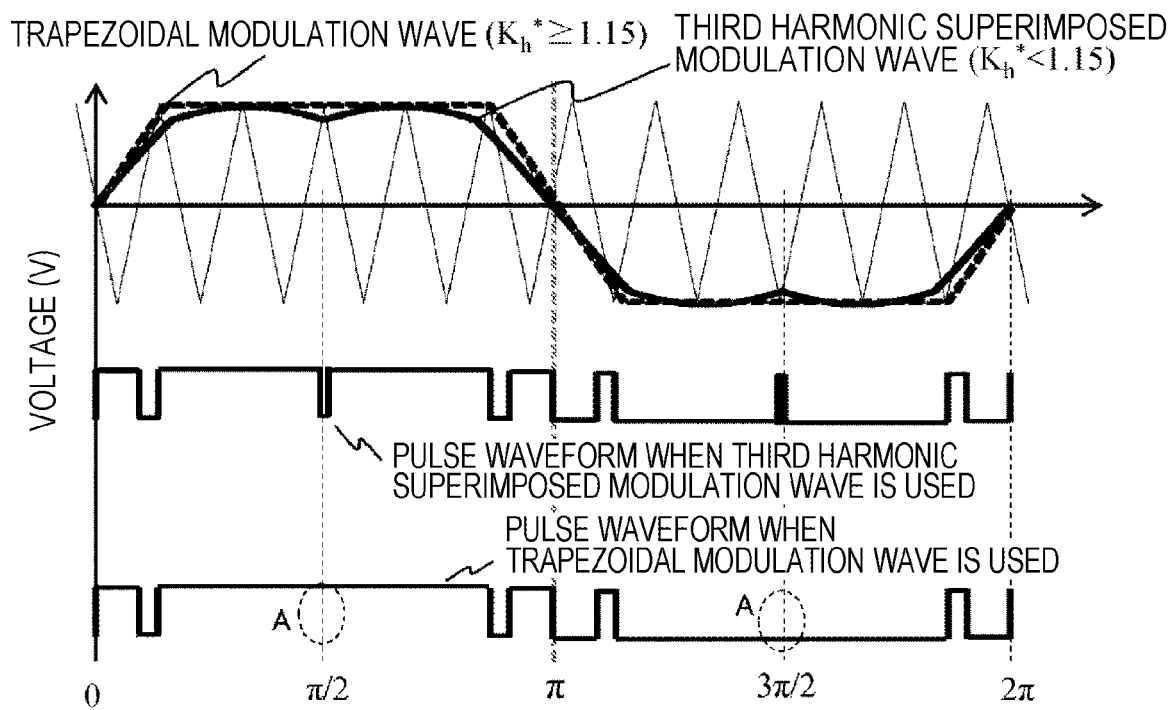
FIG. 7 is a diagram exemplifying a case where a phase compensation amount calculation unit calculates a phase compensation amount $\Delta\theta$.
Figure 7:
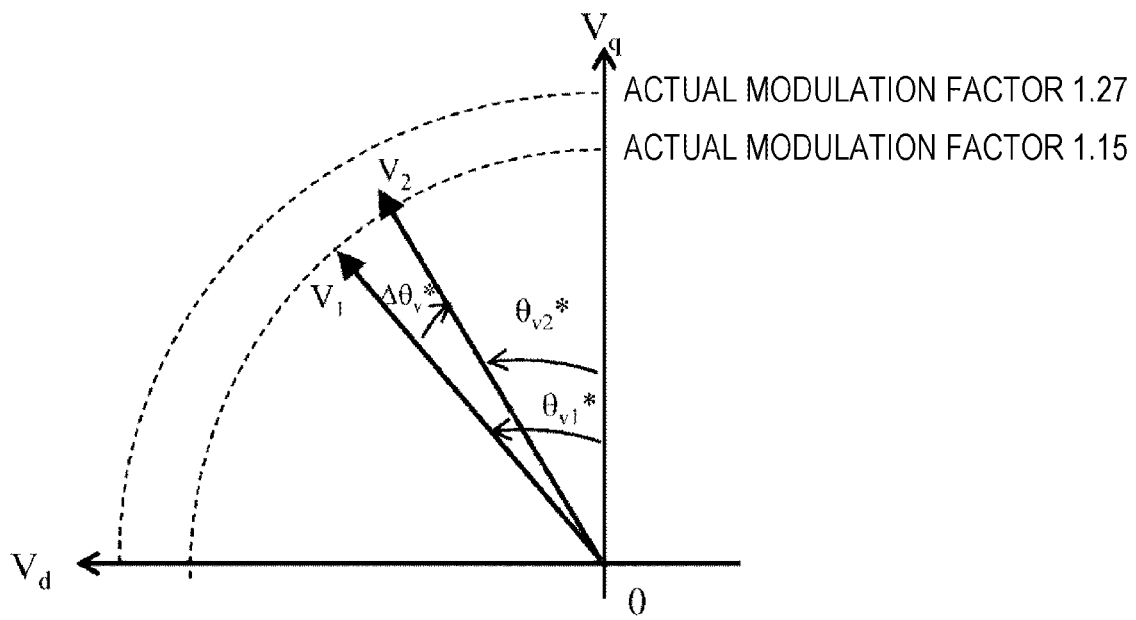
Figure 8:
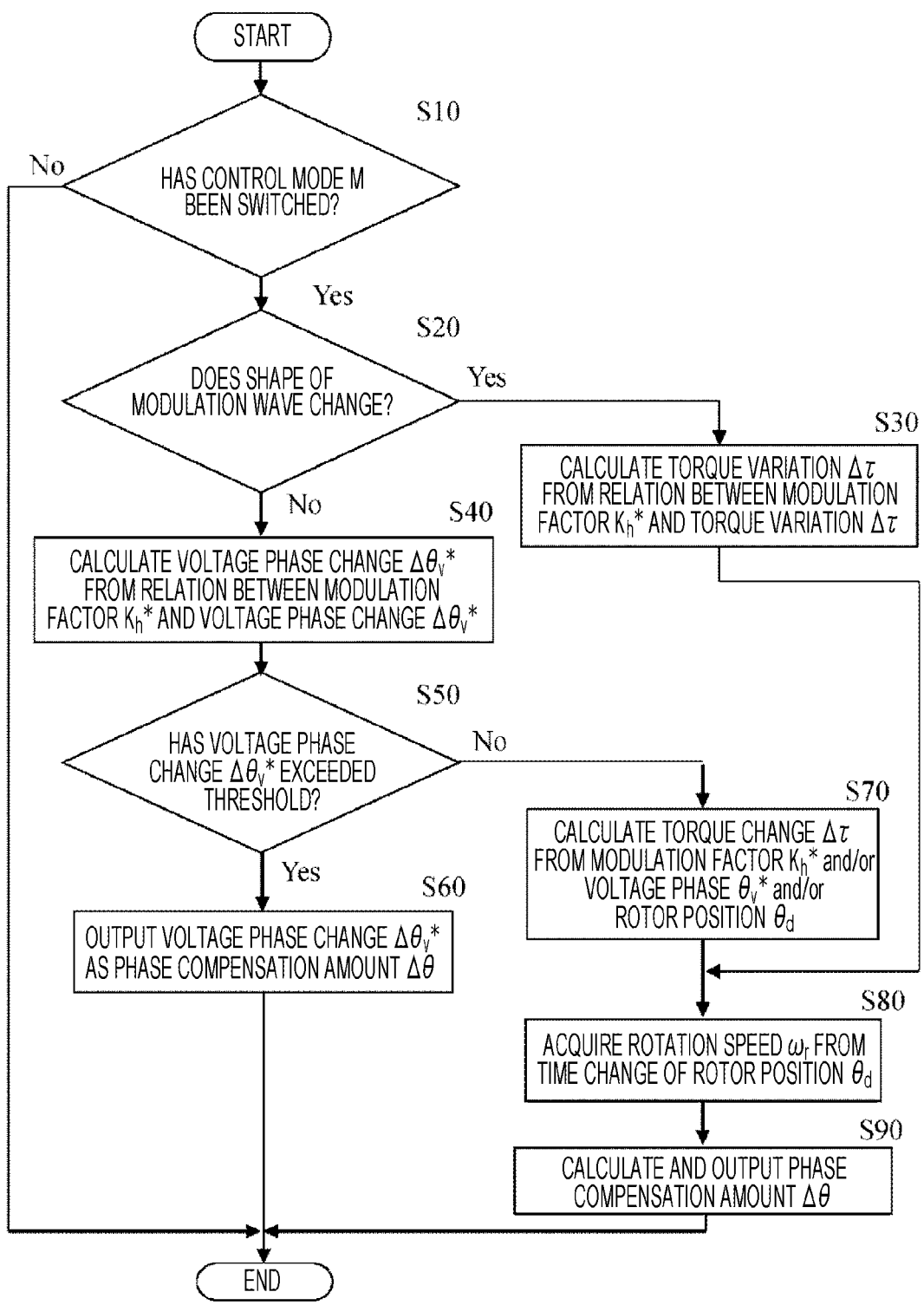
FIG. 8 is a processing flowchart of a phase compensation amount calculation unit.

Next, specific processing contents of the phase compensation amount calculation unit 110 will be described with reference to FIGS. 7 and 8. FIG. 7 is a diagram illustrating a case where the phase compensation amount calculation unit 110 calculates the phase compensation amount Δθ. In FIG. 7, (a) illustrates a state of pulse disappearance due to a shape change of the modulation wave, and (b) illustrates a state of switching shock. FIG. 8 is a processing flowchart of the phase compensation amount calculation unit 110.

When the control mode M is switched by the control selection unit 90, the phase compensation amount calculation unit 110 calculates the phase compensation amount Δθ according to, for example, one of the following (1) to (3). On the other hand, except when the control mode M is switched, the phase compensation amount calculation unit 110 outputs the phase compensation amount 10 as 0.

(1) When the Waveform of the Modulation Wave Changes

In the example illustrated in FIG. 7(a), in the linear area where the modulation factor Kh* is less than 1.15, a modulation wave output from the control selection unit 90 to the PWM control unit 100, that is, the waveform of the three-phase voltage command Vuvw* is a superimposed wave of the third harmonic in which the third harmonic is superimposed on the fundamental wave. On the other hand, in the overmodulation area where the modulation factor Kh* is 1.15 or more, the waveform of the three-phase voltage command Vuvw*, which is a modulation wave, is a trapezoidal wave. As described above, when the waveforms of the modulation waves are different between the linear area and the overmodulation area, the pulse disappearance becomes remarkable as illustrated in part A of FIG. 7(a). As a result, the torque fluctuation $\Delta\tau$ due to the switching shock increases.

Therefore, in the motor drive device 120 of this embodiment, when the waveform of the modulation wave is changed as described above due to the change of the control mode M, the information such as the arithmetic equation or the map representing the relation between the modulation factor Kh* and the torque fluctuation $\Delta\tau$ is stored in advance in the phase compensation amount calculation unit 110. Thereby, the torque fluctuation $\Delta\tau$ corresponding to the shape change of the modulation wave can be calculated from the modulation factor Kh*. When the control mode M is switched, the phase compensation amount calculation unit 110 uses this information to estimate the torque fluctuation $\Delta\tau$ based on the modulation factor Kh* after the switching. Then, the phase compensation amount $\Delta\theta$ for suppressing the estimated torque fluctuation $\Delta T$ is calculated using the above-mentioned (Equation 6) to (Equation 8), and is output to the control selection unit 90. Further, the rotation speed $\omega r$ in (Equation 7) may be calculated based on the time change of the rotor position $\theta d$.

(2) When the Change in Voltage Phase at the Time of Switching Shock is Large

In the example illustrated in FIG. 7(b), when the modulation area is switched, the value of the voltage phase $\theta v*$ greatly changes from $\theta v1*$ to $\theta v2*$, thereby causing a switching shock. Therefore, in the motor drive device 120 of this embodiment, when the value of the voltage phase $\theta v*$ significantly changes due to the change of the control mode M, the information such as an arithmetic equation and a map representing the relation between the modulation factor Kh* and a change amount $\Delta\theta v*$ of the voltage phase $\theta v*$ is stored in advance in the phase compensation amount calculation unit 110. Thus, the voltage phase change amount $\Delta\theta v*$ corresponding to the change in the modulation area can be calculated from the modulation factor Kh*. When the control mode M is switched, the phase compensation amount calculation unit 110 uses this information to estimate the voltage phase change amount $\Delta\theta v*$ based on the modulation factor Kh* after the switching. Then, when the estimated voltage phase change amount $\Delta\theta v*$ exceeds a predetermined threshold value, the voltage phase change amount $\Delta\theta v*$ is output to the control selection unit 90 as the phase compensation amount $\Delta\theta$ so as to cancel the voltage phase change amount $\Delta\theta v*$.

(3) Other Cases

In cases other than (1) and (2), in the motor drive device 120 of this embodiment, the information such as an arithmetic equation and a map representing the relation between the torque fluctuation $\Delta T$ and at least one of the modulation factor Kh*, the voltage phase $\theta v*$, and the rotor position $\theta d$ is stored in advance in the phase compensation amount calculation unit 110. Thereby, the torque fluctuation $\Delta\tau$ corresponding to the change of the modulation area can be calculated from variables such as the modulation factor Kh*, the voltage phase $\theta v*$, and the rotor position $\theta d$. When the control mode M is switched, the phase compensation amount calculation unit 110 uses this information to estimate the torque fluctuation $\Delta T$ based on the modulation factor Kh*, the voltage phase $\theta v*$, or the rotor position $\theta d$ after the switching. At this time, the torque fluctuation $\Delta\tau$ may be estimated using a plurality of variables among the modulation factor Kh*, the voltage phase $\theta v*$, and the rotor position $\theta d$. Then, the phase compensation amount $\Delta\theta$ for suppressing the estimated torque fluctuation $\Delta\tau$ is calculated using the above-mentioned (Equation 6) to (Equation 8), and is output to the control selection unit 90. As in the case of the above (1), the rotation speed $\omega r$ in (Equation 7) may be calculated based on the time change of the rotor position $\theta d$.

When calculating the phase compensation amount $\Delta\theta$ as described above, the phase compensation amount calculation unit 110 executes processing according to, for example, the processing flow of FIG. 8. The phase compensation amount calculation unit 110 performs the processing illustrated in the processing flow of FIG. 8 at predetermined intervals, for example, by executing a predetermined program in the CPU.

In Step S10, the phase compensation amount calculation unit 110 determines whether the control mode M has been switched by the control selection unit 90. As a result, if the control mode M has been switched, the process proceeds to Step S20. On the other hand, if the control mode M has not been switched, the processing flow of FIG. 8 ends. In this case, the phase compensation amount calculation unit 110 outputs the phase compensation amount $\Delta\theta$ to the control selection unit 90 as 0.

In Step S20, the phase compensation amount calculation unit 110 determines whether the shape of the modulation wave changes between the linear area and the overmodulation area, as described in (1) above. As a result, if the shape of the modulation wave changes, the process proceeds to Step S30, and if not, the process proceeds to Step S40.

In Step S30, the phase compensation amount calculation unit 110 calculates the torque fluctuation $\Delta\tau$ according to the modulation factor Kh* after switching the control mode, using the relation between the modulation factor Kh* and the torque fluctuation $\Delta\tau$ stored in advance by a map or the like. If the torque fluctuation $\Delta\tau$ can be calculated by executing Step S30, the phase compensation amount calculation unit 110 advances the processing to Step S80.

In Step S40, the phase compensation amount calculation unit 110 uses the relation between the modulation factor Kh* and the voltage phase change $\Delta\theta v*$ stored in advance using a map or the like to calculate the voltage phase change amount $\Delta\theta v*$ corresponding to the modulation factor Kh* after switching the control mode.

In Step S50, the phase compensation amount calculation unit 110 determines whether the voltage phase change amount $\Delta\theta v*$ calculated in Step S40 exceeds a predetermined threshold. As a result, if the voltage phase change amount $\Delta\theta v*$ exceeds the threshold value, the process proceeds to Step S60, and if not, the process proceeds to Step S70.

In Step S60, the phase compensation amount calculation unit 110 outputs the voltage phase change amount $\Delta\theta v*$ calculated in Step S40 to the control selection unit 90 as the phase compensation amount Δθ as described in (2) above. Thus, based on the voltage phase change amount Δθv*, the phase compensation amount Δθ for canceling out the change amount is calculated and output. After outputting the phase compensation amount Δθ in Step S60, the phase compensation amount calculation unit 110 ends the processing flow of FIG. 8.

In Step S70, as described in (3) above, the phase compensation amount calculation unit 110 calculates the torque fluctuation Δτ corresponding to these variables after switching the control mode using the relation between the torque fluctuation Δτ and the modulation factor Kh* and/or the voltage phase θv* and/or the rotor position θd stored in advance using a map or the like. If the torque fluctuation Δτ can be calculated by executing Step S70, the phase compensation amount calculation unit 110 advances the processing to Step S80.

In Step S80, the phase compensation amount calculation unit 110 acquires the rotation speed ωr of the AC motor 10 by measuring the time change of the rotor position θd.

In Step S90, the phase compensation amount calculation unit 110 calculates the phase compensation amount Δθ using the above-mentioned (Equation 6) to (Equation 8) based on the torque fluctuation Δτ calculated in Step S30 or S70 and the rotation speed ωr acquired based on the rotor position θd in Step S80. Then, the calculated phase compensation amount Δθ is output to the control selection unit 90. Thereby, based on the torque fluctuation Δτ and the rotor position θd, the phase compensation amount Δθ for canceling out the torque fluctuation Δτ is calculated and output. After outputting the phase compensation amount Δθ in Step S90, the phase compensation amount calculation unit 110 ends the processing flow of FIG. 8.

Figure 9:
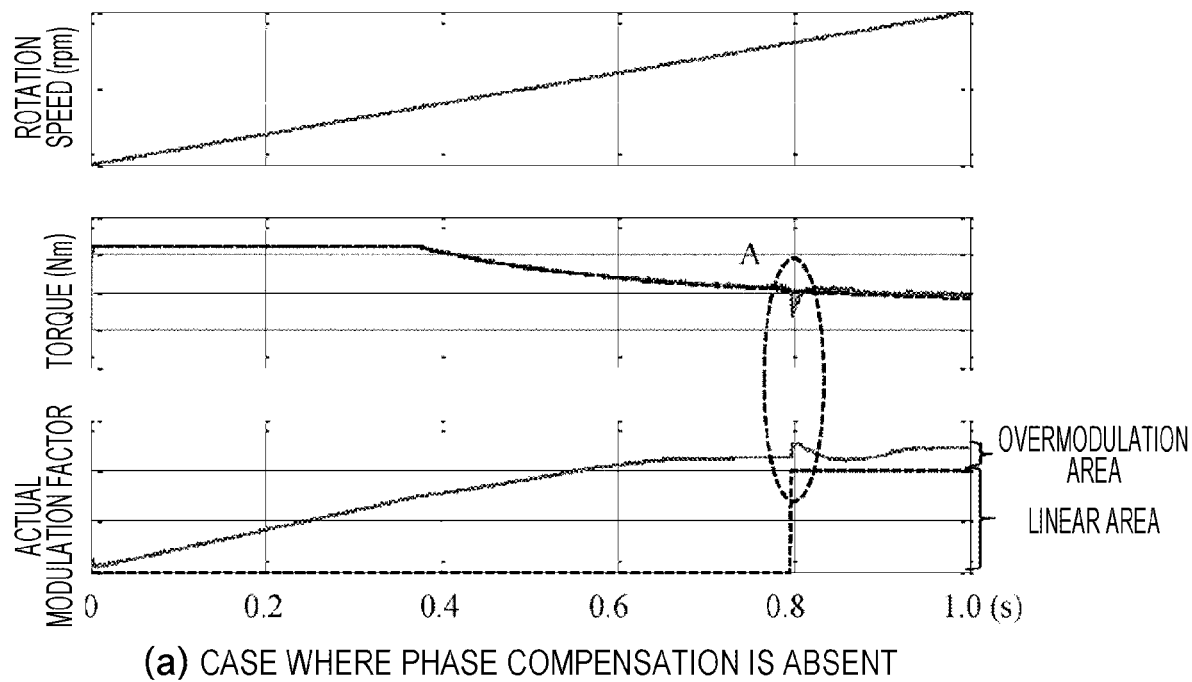
FIG. 9 is a diagram for explaining the operation of the motor drive system according to the first embodiment of the invention.
Figure 9:
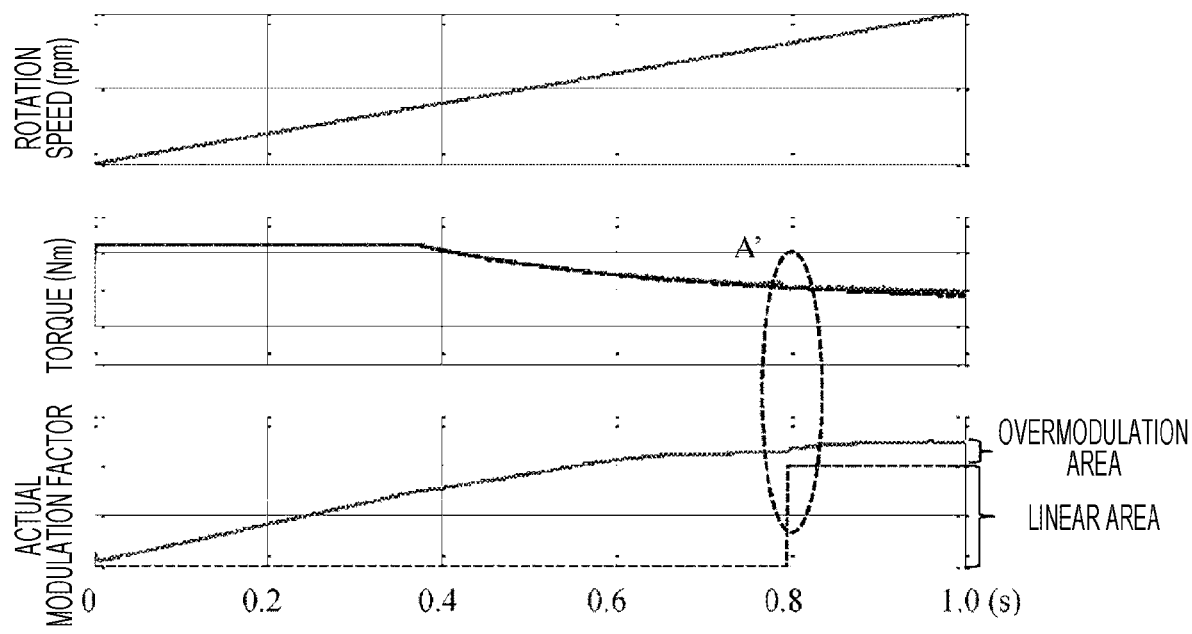

FIG. 9 is a diagram for explaining the operation of the motor drive system according to the first embodiment of the invention. In FIG. 9, (a) illustrates an example of the relation among the rotation speed of the AC motor 10, the torque τ, and the actual modulation factor Kh without phase compensation, and (b)

illustrates an example of the relation among the rotation speed of the AC motor 10, the torque τ, and the actual modulation factor Kh when phase compensation is performed.

In a case where the phase compensation is not performed in the motor drive device 120, as illustrated in part A of FIG. 9(a), when the modulation area switches from the linear area to the overmodulation area, the torque τ fluctuates greatly because the actual modulation factor Kh sharply increases. On the other hand, in a case where the phase compensation is performed in the motor drive device 120, even when the modulation area is switched from the linear area to the overmodulation area as illustrated in part A' of FIG. 9(b), the switching shock is suppressed and the actual modulation factor Kh transitions smoothly, and the fluctuation of the torque τ is reduced. Therefore, it can be seen that the motor drive system of this embodiment can drive the AC motor 10 stably over a wide operating range by performing the phase compensation.

According to the first embodiment of the invention described above, the following operational advantages are achieved.

(1) The motor drive system includes the AC motor 10, the rotor position detection unit 70, the current sensor 30, the coordinate conversion unit 60, the current control unit 50, the modulation factor/voltage phase calculation unit 80, the phase compensation amount calculation unit 110, the control selection unit 90, the PWM control unit 100, and the motor drive device 120 which includes the inverter 20. In the motor drive device 120, the rotor position detection unit 70 detects the rotor position θd of the AC motor 10. The current sensor 30 detects the three-phase AC currents Iu, Iv, and Iw flowing through the AC motor 10. The coordinate conversion unit 60 calculates the d-axis current Id and the q-axis current Iq of the AC motor 10 based on the rotor position θd and the three-phase AC currents Iu, Iv, and Iw. The current control unit 50 outputs the d-axis voltage command Vd* and the q-axis voltage command Vq* based on the input d-axis current command value Id* and q-axis current command value Iq*, and based on the d-axis current Id and the q-axis current Iq. The modulation factor/voltage phase calculation unit 80 calculates the modulation factor Kh* and the voltage phase θv* based on the d-axis voltage command Vd* and the q-axis voltage command Vq*. The phase compensation amount calculation unit 110 calculates the phase compensation amount Δθ for compensating the voltage phase θv*. The control selection unit 90 outputs the three-phase voltage command Vuvw* according to any one of the plurality of control modes based on the modulation factor Kh*, the voltage phase θv*, and the phase compensation amount Δθ. The PWM control unit 100 outputs the gate signals Gun, Gup, Gvn, Gvp, Gwn, and Gwv based on the three-phase voltage command Vuvw* and the rotor position θd. The inverter 20 has a plurality of switching elements, and controls the plurality of switching elements based on gate signals Gun, Gup, Gvn, Gvp, Gwn, and Gwv to drive the AC motor 10. In this motor drive system, when the control mode is switched in the control selection unit 90, the phase compensation amount calculation unit 110 calculates the phase compensation amount Δθ and outputs the calculated amount to the control selection unit 90. With this configuration, the torque fluctuation of the AC motor 10 when the control mode is switched can be suppressed by the phase compensation, and the switching shock can be reduced.

(2) The control selection unit 90 includes the modulation area selection unit 91, the final voltage phase calculation unit 92, and the voltage command calculation unit 93. The modulation area selection unit 91 selects any one of the linear area, the overmodulation area, and the rectangular wave area based on the modulation factor Kh*, and determines the control mode M according to the selected modulation area. The final voltage phase calculation unit 92 calculates the final voltage phase θv** based on the voltage phase θv* and the phase compensation amount Δθ. The voltage command calculation unit 93 calculates the three-phase voltage command Vuvw* based on the control mode M determined by the modulation area selection unit 91 and the final voltage phase θv** calculated by the final voltage phase calculation unit 92. Thus, the control selection unit 90 can select an appropriate control mode according to the modulation factor Kh*, and can output the three-phase voltage command Vuvw* with reduced switching shock when the control mode is switched.

(3) The phase compensation amount calculation unit 110 outputs the phase compensation amount Δθ to the control selection unit 90 as 0, except when the control mode is switched (FIG. 8, Step S10: No). With this configuration, it is possible to prevent unnecessary phase compensation from being performed at timing other than when the control mode is switched.

(4) The phase compensation amount calculation unit 110 calculates the phase compensation amount Δθ based on at least one of the rotor position θd, the modulation factor Kh*, and the voltage phase θv*. Specifically, the phase compensation amount calculation unit 110 estimates the torque fluctuation Δτ of the AC motor 10 at the time of switching the control mode based on at least one of the rotor position θd, the modulation factor Kh*, and the voltage phase θv* (FIG. 8, Steps S30 and S70), and calculates the phase compensation amount Δθ based on the estimated torque fluctuation Δτ and the rotor position θd (FIG. 8, Steps S80 and S90). Further, the phase compensation amount calculation unit 110 estimates the change amount Δθv* of the voltage phase θv* at the time of switching the control mode M based on the modulation factor Kh* (FIG. 8, Step S40), and can calculate the phase compensation amount Δθ based on the estimated change amount Δθv* of the voltage phase θv* (FIG. 8, Step S60). With this configuration, the phase compensation amount calculation unit 110 can calculate the phase compensation amount Δθ that can reliably suppress the torque fluctuation of the AC motor 10 and reduce the switching shock.

In the first embodiment described above, the example in which the PWM control unit 100 performs the asynchronous PWM control has been described. However, the same effect can be obtained when performing the synchronous PWM control. Further, in the first embodiment, the threshold values of the modulation factor Kh* for switching from the linear area to the overmodulation area (when the modulation factor Kh* increases), and switching from the overmodulation area to the linear area (when the modulation factor Kh* decreases) has been described as 1.15, but may be set to other values. Furthermore, different threshold values may be set for the increase and decrease of the modulation factor Kh*. That is, in the control selection unit 90, the modulation area selection unit 91 can set different values for a threshold of the modulation factor Kh* used for selecting a modulation area when the modulation factor Kh* is increased, and a threshold of the modulation factor Kh* used for selecting a modulation area when the modulation factor Kh* is decreased. With such a configuration, it possible to flexibly select a modulation area.

Second Embodiment

Hereinafter, a second embodiment of the invention will be described with reference to FIG. 10. However, the description of the same configuration as in the first embodiment will be omitted.

Figure 10:
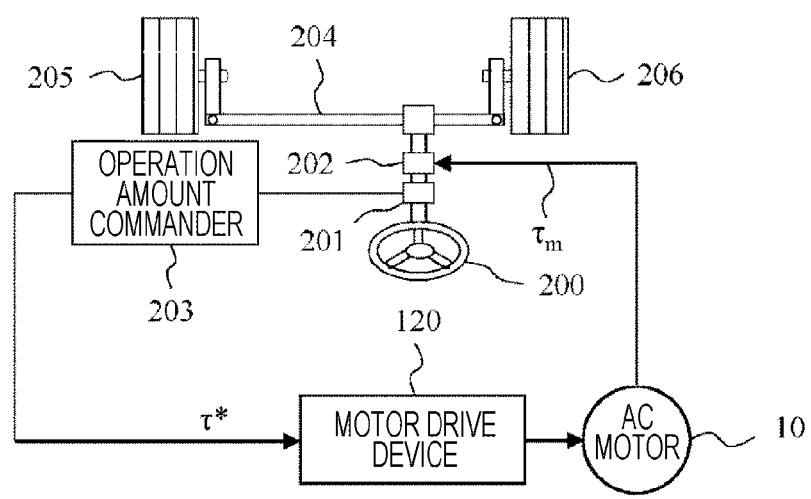
FIG. 10 is a configuration diagram of an electric power steering device equipped with a motor drive system according to a second embodiment of the invention.

FIG. 10 is a configuration diagram of an electric power steering device equipped with a motor drive system according to the second embodiment of the invention. The electric power steering device illustrated in FIG. 10 includes the AC motor 10 and the motor drive device 120 described in the first embodiment, and operates using the AC motor 10 as a drive source. That is, the AC motor 10 of this embodiment is driven by the inverter 20 included in the motor drive device 120 to generate torque for assisting the operation force of the electric power steering device.

The electric power steering device of this embodiment further includes a steering detector 201, a torque transmission mechanism 202, and an operation amount commander 203, in addition to the AC motor 10 and the motor drive device 120. The steering detector 201 detects a steered angle and steering torque of a steering wheel (steering) 200 and outputs the detected values to the operation amount commander 203. Based on the steered angle and the steering torque detected by the steering detector 201, the operation amount commander 203 takes into account a state amount such as a vehicle speed and a road surface state, generates a torque command τ* to the AC motor 10 as a steering assist amount of the steering wheel 200, and outputs the torque command to the motor drive device 120. The motor drive device 120 drives the AC motor 10 such that the output torque τM of the AC motor 10 follows the torque command τ* by the method described in the first embodiment based on the torque command τ* from the operation amount commander 203.

The AC motor 10 is driven by the motor drive device 120 to output the output torque τM to an output shaft directly connected to the rotor. The torque transmission mechanism 202 is configured using a reduction mechanism and a hydraulic mechanism such as a worm, a wheel, and a planetary gear, and transmits the output torque τM, which is transmitted from the AC motor 10 to the output shaft, to a rack 204.

With the torque transmitted to the rack 204, the steering force (operation force) of the steering wheel 200 by the driver is reduced, so that the steering assist using the electric force is performed, and the steered angles of the steered wheels 205 and 206 are controlled.

According to the second embodiment of the invention described above, the AC motor 10 is driven by the inverter 20 to generate the output torque τM for assisting the operation force of the electric power steering device. With this configuration, it is possible to reduce vibration and noise generated when the electric power steering device rotates at high speed.

Third Embodiment

Hereinafter, a third embodiment of the invention will be described with reference to FIG. 11. However, the description of the same configuration as in the first embodiment will be omitted.

Figure 11:
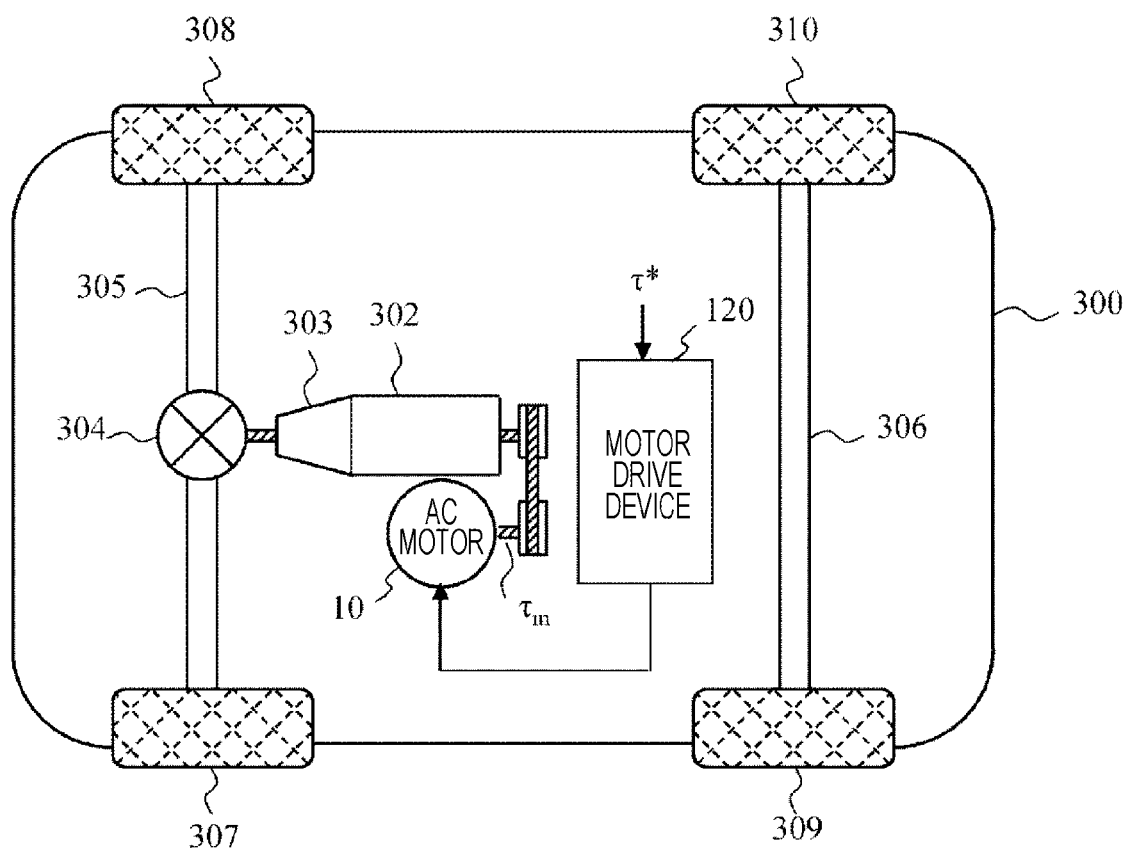
FIG. 11 is a configuration diagram of an electric vehicle equipped with a motor drive system according to a third embodiment of the invention.

FIG. 11 is a configuration diagram of an electric vehicle equipped with the motor drive system according to the third embodiment of the invention. An electric vehicle 300 illustrated in FIG. 11 is equipped with the AC motor 10 and the motor drive device 120 described in the first embodiment, and operates using the AC motor 10 as a drive source. That is, the AC motor 10 of this embodiment is driven by the inverter 20 included in the motor drive device 120 to generate torque for running the electric vehicle 300.

A drive wheel axle 305 and a driven wheel axle 306 are pivotally supported on the electric vehicle 300 of this embodiment. Drive wheels 307 and 308 are provided at both ends of the drive wheel axle 305, and driven wheels 309 and 310 are provided at both ends of the driven wheel axle 306. The drive wheels 307 and 308 and the driven wheels 309 and 310 may be either front wheels or rear wheels of the electric vehicle 300, respectively. Further, both the front wheels and the rear wheels may be used as drive wheels.

The drive wheel axle 305 is provided with a differential gear 304 as a power distribution mechanism. The differential gear 304 transmits a rotational power transmitted from an engine 302 via a transmission 303 to the drive wheel axle 305. The engine 302 and the AC motor 10 are mechanically connected, and the rotational power of the AC motor 10 is transmitted to the engine 302, and the rotational power of the engine 302 is transmitted to the AC motor 10.

The motor drive device 120 drives the AC motor 10 such that the output torque τm of the AC motor 10 follows the torque command τ* by the method described in the first embodiment based on the torque command τ* input from a higher-level controller (not illustrated). The AC motor 10 is driven by motor drive device 120 to output the output torque τm to the drive wheel axle 305 via the engine 302 and the transmission 303, and causes the electric vehicle 300 to run.

Further, the rotor receives the rotational power of the engine 302 and rotates, thereby generating three-phase AC power. That is, the AC motor 10 operates as an electric motor and also operates as a generator.

According to the third embodiment of the invention described above, the AC motor 10 is driven by the inverter 20 to generate the output torque τm for running the electric vehicle 300. With this configuration, the operating area of the electric vehicle 300 can be expanded, and a stable torque output can be obtained in the entire operating area.

In the third embodiment, the case where the electric vehicle 300 is a hybrid vehicle has been described. However, similar effects can be obtained in the case of a plug-in hybrid vehicle, an electric vehicle, and the like. Further, in the above-described third embodiment, the example has been described in which electric vehicle 300 has one AC motor 10 mounted thereon, but two or more AC motors 10 may be mounted.

Fourth Embodiment

Hereinafter, a fourth embodiment of the invention will be described with reference to FIG. 12. However, the description of the same configuration as in the first embodiment will be omitted.

Figure 12:
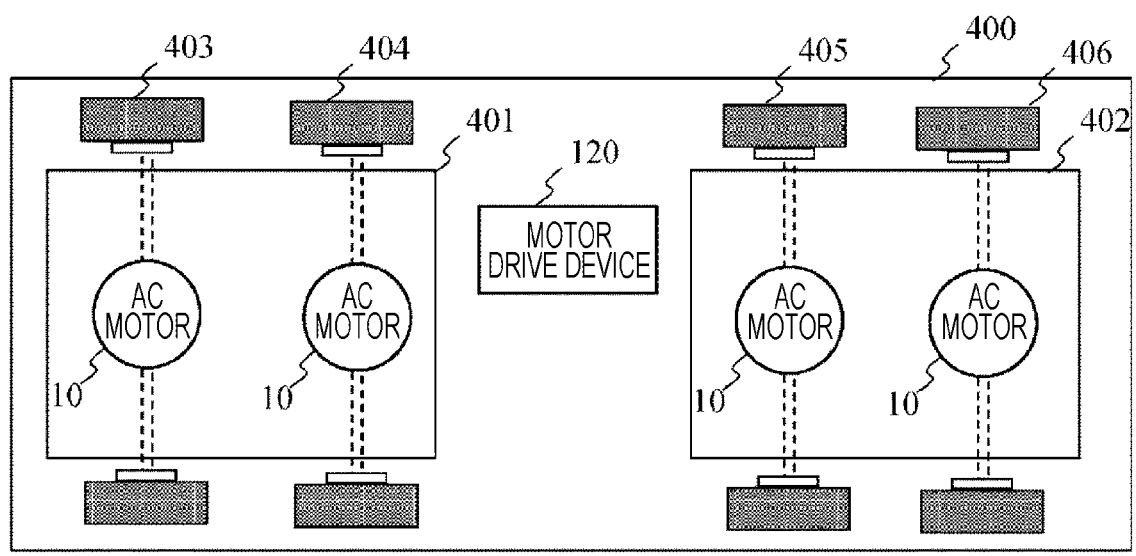
FIG. 12 is a configuration diagram of a railway vehicle equipped with a motor drive system according to a fourth embodiment of the invention.

FIG. 12 is a configuration diagram of a railway vehicle equipped with the motor drive system according to the fourth embodiment of the invention. A railway vehicle 400 illustrated in FIG. 12 has a plurality of AC motors 10 described in the first embodiment mounted thereon and also has the motor drive device 120 mounted thereon, and operates using each AC motor 10 as a drive source. That is, the AC motor 10 of this embodiment is driven by the inverter 20 included in the motor drive device 120, and thereby generating torque for running the railway vehicle 400.

Dollies 401 and 402 are mounted on the railway vehicle 400 of this embodiment. The dolly 401 is provided with wheels 403 and 404, and the dolly 402 is provided with wheels 405 and 406. The AC motor 10 is connected to each of the wheels 403 to 406.

The motor drive device 120 drives each AC motor 10 such that the output torque τm of each AC motor 10 follows the torque command τ* by the method described in the first embodiment based on the torque command τ* input from a higher-level controller (not illustrated). Each AC motor 10 is driven by the motor drive device 120 to output the output torque τm to each of the wheels 403 to 406, and causes the railway vehicle 400 to run.

According to the fourth embodiment of the invention described above, the AC motor 10 is driven by the inverter 20 to generate the output torque τM for running the railway vehicle 400. With this configuration, the operating area of the railway vehicle 400 can be expanded, and a stable torque output can be obtained in the entire operating range.

Further, the above-described embodiments and various modifications are described as merely exemplary. The invention is not limited to the contents as long as the features of the invention are not damaged. In addition, various embodiments and modifications have been described, but the invention is not limited to these contents. Other embodiments considered within a scope of technical ideas of the invention is also included in the scope of the invention.

REFERENCE SIGNS LIST

10 AC motor
11 rotational position sensor
20 inverter
30 current sensor
40 current command calculation unit
50 current control unit
60 coordinate conversion unit
70 rotor position detection unit
80 modulation factor/voltage phase calculation unit
90 control selection unit
91 modulation area selection unit
92 final voltage phase calculation unit
93 voltage command calculation unit
100 PWM control unit
110 phase compensation amount calculation unit
120 motor drive device
200 steering wheel (steering)
201 steering detector
202 torque transmission mechanism
203 operation amount commander
204 rack
205, 206 steered wheel
300 electric vehicle
302 engine
303 transmission
304 differential gear
305 drive wheel axle
306 driven wheel axle
307, 308 drive wheel
309, 310 driven wheel
400 railway vehicle
401, 402 dolly
403, 404, 405, 406 wheel

The invention claimed is:

1. A motor drive system, comprising:
an AC motor;
a rotor position detection unit that detects a rotor position of the AC motor;
a current sensor that detects a three-phase AC current flowing through the AC motor;
a coordinate conversion unit that calculates a d-axis current and a q-axis current of the AC motor based on the rotor position and the three-phase AC current;
a current control unit that outputs a d-axis voltage command and a q-axis voltage command based on an input d-axis current command value and q-axis current command value, and based on the d-axis current and the q-axis current;
a modulation factor/voltage phase calculation unit that calculates a modulation factor and a voltage phase based on the d-axis voltage command and the q-axis voltage command;
a phase compensation amount calculation unit that calculates a phase compensation amount for compensating the voltage phase;
a control selection unit that outputs a three-phase voltage command according to any one of a plurality of control modes based on the modulation factor, the voltage phase, and the phase compensation amount;
a PWM control unit that outputs a gate signal based on the three-phase voltage command and the rotor position;
a modulation area selection unit that, based on the modulation factor, selects any modulation area among a linear area, an overmodulation area, and a rectangular wave area, and determines the control mode according to a selected modulation area;

a final voltage phase calculation unit that calculates a final voltage phase based on the voltage phase and the phase compensation amount;

a voltage command calculation unit that calculates the three-phase voltage command based on the control mode determined by the modulation area selection unit and the final voltage phase calculated by the final voltage phase calculation unit; and an inverter that includes a plurality of switching elements, and controls the plurality of switching elements based on the gate signal to drive the AC motor, wherein the phase compensation amount calculation unit calculates the phase compensation amount and outputs the calculated amount to the control selection unit when the control mode is switched by the control selection unit.

2. The motor drive system according to claim 1, wherein the modulation area selection unit sets different thresholds for the modulation factor used to select the modulation area when the modulation factor is increased, and the modulation factor threshold used to select the modulation area when the modulation factor is reduced.

3. The motor drive system according to claim 1, wherein the phase compensation amount calculation unit sets the phase compensation amount to 0 and outputs the phase compensation amount to the control selection unit except when the control mode is switched.

4. The motor drive system according to claim 1, wherein the phase compensation amount calculation unit calculates the phase compensation amount based on at least one of the rotor position, the modulation factor, and the voltage phase.

5. The motor drive system according to claim 4, wherein the phase compensation amount calculation unit estimates a change amount of the voltage phase at the time of switching the control mode based on the modulation factor, and calculates the phase compensation amount based on the estimated change amount of the voltage phase.

6. The motor drive system according to claim 1, wherein the AC motor is driven by the inverter to generate torque for assisting an operation force of an electric power steering device.

7. The motor drive system according to claim 1, wherein the AC motor is driven by the inverter to generate torque for running an electric vehicle.

8. The motor drive system according to claim 1, wherein the AC motor is driven by the inverter to generate torque for running a railway vehicle.

9. A motor drive system comprising:
an AC motor;
a rotor position detection unit that detects a rotor position of the AC motor;
a current sensor that detects a three-phase AC current flowing through the AC motor;
a coordinate conversion unit that calculates a d-axis current and a q-axis current of the AC motor based on the rotor position and the three-phase AC current;
a current control unit that outputs a d-axis voltage command and a q-axis voltage command based on an input d-axis current command value and q-axis current command value, and based on the d-axis current and the q-axis current;
a modulation factor/voltage phase calculation unit that calculates a modulation factor and a voltage phase based on the d-axis voltage command and the q-axis voltage command;
a phase compensation amount calculation unit that calculates a phase compensation amount for compensating the voltage phase;
a control selection unit that outputs a three-phase voltage command according to any one of a plurality of control modes based on the modulation factor, the voltage phase, and the phase compensation amount;
a PWM control unit that outputs a gate signal based on the three-phase voltage command and the rotor position;
an inverter that includes a plurality of switching elements, and controls the plurality of switching elements based on the gate signal to drive the AC motor,
wherein the phase compensation amount calculation unit calculates the phase compensation amount and outputs the calculated amount to the control selection unit when the control mode is switched by the control selection unit
wherein the phase compensation amount calculation unit calculates the phase compensation amount based on at least one of the rotor position, the modulation factor, and the voltage phase, and
wherein the phase compensation amount calculation unit estimates a torque fluctuation of the AC motor at the time of switching the control mode based on at least one of the rotor position, the modulation factor, and the voltage phase, and calculates the phase compensation amount based on the estimated torque fluctuation and the rotor position.

* * * * *